United States Patent Office 3,214,580
Patented Oct. 26, 1965

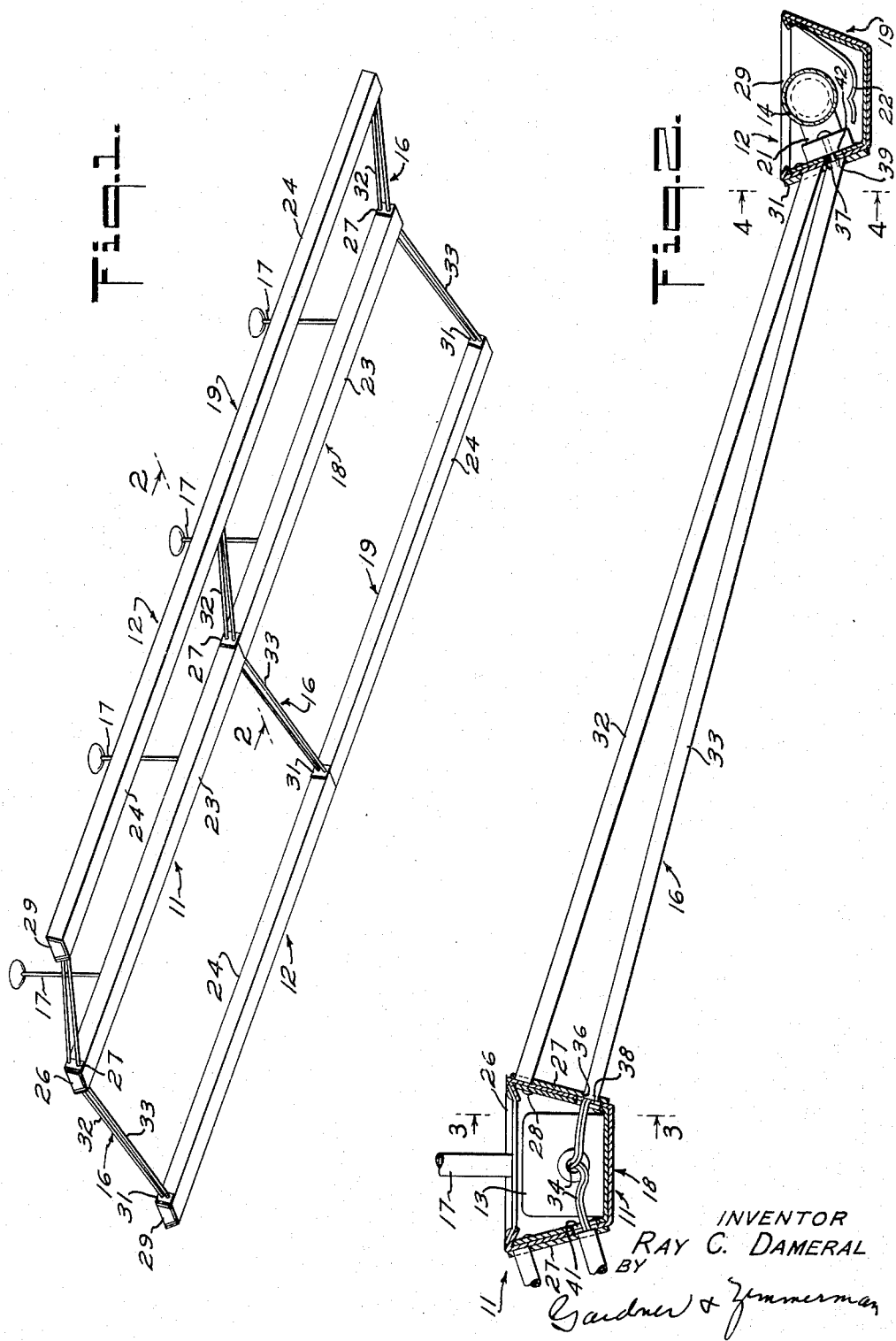

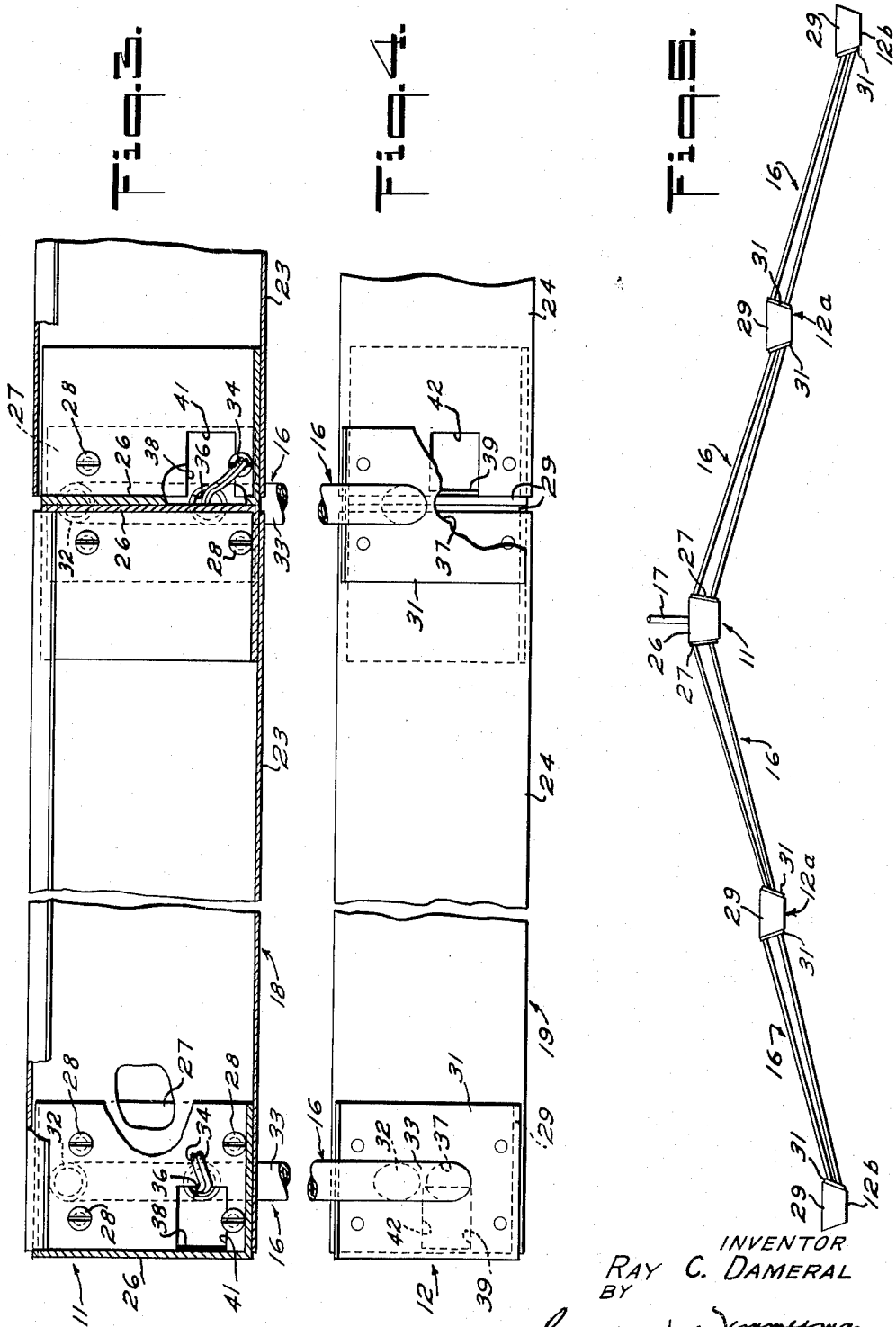

3,214,580
INDIRECT LIGHTING FIXTURE SYSTEM
Ray C. Dameral, Pleasant Hill, Calif., assignor to Herst Lighting Corporation, doing business as Peerless Electric Company, San Francisco, Calif., a corporation of California
Filed Dec. 31, 1962, Ser. No. 248,349
5 Claims. (Cl. 240—51.11)

This invention relates to indirect lighting systems of the type wherein one or more ballast housing units and one or more light housing units are supported adjacent a ceiling with the light housing units electrically energized from the ballast housing units and directing light upon the ceiling which is in turn reflected therefrom to illuminate an underlying area in an indirect manner. The invention is more particularly directed to an indirect lighting system of the foregoing type which is arranged such that the dark areas or shadows commonly persisting in the vicinity of the non-illuminating ballast housing units are, to a large extent, eliminated.

Indirect lighting of large interior areas is commonly facilitated by lighting systems which include a plurality of light housing units supported in parallel rows subjacent a ceiling. The light housing units are arranged to beam light upon the ceiling, the light being in turn reflected therefrom to the underlying area to be illuminated. More particularly, the light housing units include light housings which are pervious to light only in the upper portions thereof. Light rays emanating from fluorescent light tubes or the like mounted in the housings hence can only emerge from the upper portion thereof. The amount of light beamed from the housing is frequently enhanced by the employment of reflectors therein which serve to reflect the downwardly and sidewardly directed light from the tube upwardly through the top of the housing. Accordingly, there is substantial illumination generated in the region of the light housing units and such illumination is of an indirect nature. The light tubes are masked from vantage points in the indirectly illuminated area and same is devoid of direct light rays. Accordingly, the indirect lighting is particularly beneficial from the standpoint of its ease on the eyes.

Unfortunately, in indirect lighting systems of the type outlined above, the fluorescent light tubes of the light housing units require ballast elements in association with the light tubes to facilitate their energization. Inasmuch as the ballast elements are relatively massive, it is the common practice to house same within separate ballast housing units also supported subjacent the ceiling in integral association with the lamp housing units, and with the ballast elements in electrical connection with the light tubes. Since the ballast housing units are nonilluminating, shadows exist in the regions of the lighting system surrounding same. These shadows in the overall array of ballast housing units and light housing units are, of course, undesirable inasmuch as they detract from the uniformity of illumination produced in the indirectly illuminated area.

Accordingly, it is an object of the present invention to provide an improved indirect lighting system including ballast housing units and light housing units arranged in such a manner that shadows in the regions of the ballast units are minimized and uniformity of illumination is increased.

Another object of the invention is the provision of an indirect lighting system of the class described wherein the ballast housing units and light housing units are disposed in integrally attached parallel rows with the light housing units downwardly displaced from the ballast housing units whereby light emanating from the tops of the former serves to illuminate the latter.

It is still another object of the invention to provide an indirect lighting system of the class described which may be arranged such that, in addition to the regions in the vicinity of the ballast housing units being illuminated, the illumination in the vicinities of the light housing units is enhanced.

It is a further object of the invention to provide an indirect lighting system of the class described which features a unique joint arrangement for the attachment of support struts between a ballast housing unit and light housing unit in such a manner that the electrical wiring connecting the ballast elements and light tubes may be led through the struts in totally masked relation to vantage points in the indirectly illuminated area.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

FIGURE 1 is a perspective view of an indirect lighting system in accordance with the present invention.

FIGURE 2 is a sectional view taken at line 2—2 of FIGURE 1.

FIGURE 3 is a sectional view taken at line 3—3 of FIGURE 2.

FIGURE 4 is a sectional view taken at line 4—4 of FIGURE 2.

FIGURE 5 is an end view of a modified form of indirect lighting system in accordance with the invention arranged to enhance illumination in the vicinities of the light housing units as well as to illuminate regions surrounding the ballast housing unit.

Referring now to the drawings, FIGURES 1 and 2 in particular, there will be seen to be provided an indirect lighting fixture system comprised of at least one ballast housing unit 11 and at least one light housing unit 12 adapted for support subjacent a ceiling. The ballast housing units 11 contain ballast elements 13 and are non-illuminating. The light housing units 12, on the other hand, contain fluorescent light tubes 14 or the like in electrical connection with the ballast elements, and are open topped such that light rays emanating from the light tubes are beamed upwardly and reflected from the ceiling to indirectly illuminate an underlying area. To this extent the lighting system is conventional. However, in accordance with the present invention the ballast housing and light housing units 11, 12 are so arranged that the region surrounding each nonilluminating ballast housing unit is illuminated, and accordingly the shadows, or relatively dark areas, normally existing in the vicinity of a ballast housing unit of a conventional system are greatly minimized. More particularly, in accordance with the general aspects of the present invention the ballast housing and light housing units 11, 12 are disposed in parallel tiered rows with light housing units being downwardly displaced from adjacent ballast housing units. Hence, light emerging from the tops of the light housing units illuminates the regions surrounding adjacent upwardly displaced ballast housing units or other light housing units. As a result, the usual shadows existing in the vicinities of the ballast housing units are minimized and illumination adjacent the lower portions of the light housing units is enhanced.

The general principles of the present invention may, of course, be applied to numerous arrangements of indirect lighting systems. Considering now the specific arrangement illustrated in FIGURES 1-4, in detail as to preferred structure, it will be noted that one ballast housing unit 11 and two light housing units 12 are integrally incorporated as a system. The light housing units are disposed on opposite sides of the ballast housing unit in parallel outwardly and downwardly spaced relation thereto. Attachment of the ballast and light housing units in such relationship is facilitated as by means of inclined transversely extending strut assemblies 16 interconnecting the units at longitudinally spaced locations thereof. Suspension of the overall structure is facilitated as by means of hanger rods 17 projecting upwardly from the ballast housing unit at longitudinally spaced positions thereof and adapted for attachment to a ceiling.

The ballast and light housing units 11, 12 include housings 18, 19 which are both preferably of inverted symmetrical trapezoidal cross section, although other cross sectional configurations can as well be employed. The ballast housing 18 may be open or closed at its top and serves to contain the ballast elements 13 in the usual manner. Each light housing 19 has an open top, or a top which is otherwise pervious to light. Suitable sockets 21 are provided within the housing 19 at longitudinally spaced positions thereof to facilitate mounting of the fluorescent light tubes 14 therebetween, in the usual manner. In addition, a reflector 22 is preferably provided within the housing in accordance with common practice to reflect light directed sidewardly and downwardly from the light tubes upwardly through the top of the housing. The strut assemblies 16 are arranged to support the light housings sufficiently below the ballast housing that a portion of the light rays emerging from the tops of the former intercepts the bottom of the latter.

The ballast and light housings 18, 19 are advantageously respectively formed of pluralities of modular housing sections 23, 24 which are adapted to ready end-to-end attachment. Housings of substantially any desired lengths may then be formed to accommodate a variety of installation requirements. To this end, each modular housing section 23 is provided with end plates 26 (FIGURE 3) at its opposite ends in outwardly adjacent relation thereto. Accordingly, adjacent aligned sections 23 may be abutted at the end plates 26. Bracket plates 27 may then be secured as by means of screws 28, to the exterior faces of aligned side walls of the adjacent sections in bridging relation to their abutting end plates to thus form a rigid joint thereat. Similarly, the modulator light housing sections are provided with end plates 29 (see FIGURE 4) and securable by bracket plates 31. Preferably, the bracket plates 27, 31 are terminal elements of the strut assemblies 16. More particularly, the strut assemblies are each formed by a pair of tubular struts 32, 33 secured at their opposite ends to the bracket plates 27, 31. The struts are, of course, in appropriate angular relationship to the bracket plates to facilitate the tiered dispositions of the ballast and light housings, in accordance with the basic concept of the invention, when the bracket plates are secured to the side walls of the respective housings.

The ballast elements 13 within the ballast housing 18 must be electrically connected to the light tubes 14 in the light housings 19. To this end, wire leads 34 in electrical connection with the ballast elements and light tube sockets 21 extend between the ballast and light housings. Such leads 34 are desirably masked from vantage points in the illuminated area subjacent the lighting system. Preferably the foregoing is accomplished by enclosing the leads 34 within one of the tubular struts of each strut assembly, namely, strut 33. In order that the leads may be extended through the struts from the ballast and light housings, apertures 36, 37, are provided in bracket plates 27, 31 to open the strut bore to the faces of these plates which abut the side walls of the housings. Openings 38, 39 are then formed through the side walls of each housing section 23 and housing section 24 adjacent one end thereof. The end plates 26 and 29 which are disposed at the apertured end of each housing section 23 and 24 are also provided with openings 41 and 42 in registration with the openings 38 and 39 respectively. It is particularly important to note that the openings 38, 39, 41 and 42 are so arranged that they are covered by the bracket plates 27, 31, as secured to the housing section side walls, and yet enable the leads 34 to be led therethrough from the interiors of the housing sections and through the apertures 36, 37 into the strut bores. In this regard, it will be appreciated that the relative positions between the apertures and openings are dissimilar for a bracket plate bridging two abutting housing sections, and a bracket plate secured adjacent the free end of a housing section. In order that a single form of bracket plate may be employed in both situations, despite the dissimilarity in relative positions of the apertures and openings, the openings are of elongated rectangular form and extend longitudinally inward from one end of the housing side walls a distance less than half the width of the bracket plates and greater than the difference between half the width of the bracket plates and the radius of the apertures 36, 37. Thus, no matter whether the bracket plates of the strut assemblies are secured to the free ends of housing sections, or in bridging relation to adjacent sets of housing sections to form joints thereat, the openings 38, 39, 41 and 42 are entirely covered by the bracket plates yet they communicate with the apertures 36, 37 to permit entry of the leads to the bores of the struts 33. The leads are accordingly entirely masked from view.

As noted hereinbefore, the basic concept of the invention may be employed to enhance illumination of areas subjacent the light housing units 12, in addition to illuminating areas subjacent the ballast housing units 11. In this regard, a modified form of lighting system, as depicted in FIGURE 5, may be employed. As shown therein, a system is provided which is generally similar to that depicted in FIGURES 1 and 2, but which includes a plurality of light housing units 12 in parallel tiered relationship on opposite sides of a central ballast housing unit 11. More particularly, a pair of light housing units 12a, are disposed on opposite sides of the ballast housing unit 11 in outwardly downwardly spaced relation thereto. Light emerging from the tops of these light housing units serves to illuminate the ballast housing unit in the same manner as previously described with respect to the embodiment of FIGURES 1 and 2. One or more additional pairs of light housing units 12b, are, in turn, disposed in outwardly downwardly spaced relation to the light housing units 12a. Hence, each outwardly successive pair of light housing units serves to illuminate the underlying portions of the inwardly adjacent pair of light housing units. The ballast housing unit and pairs of light housing units may be advantageously integrally interconnected by strut assemblies 16 of the type detailed hereinbefore.

What is claimed is:

1. An indirect lighting system for providing uniform indirect illumination comprising at least one ballast housing unit adapted for support subjacent a light reflective ceiling, ballast elements disposed within said ballast housing unit, at least one pair of light housing units having light pervious upper portions through which light can pass generally upwardly to be reflected from said light reflective ceiling, said light housing units being disposed on opposite sides of the ballast housing unit in widely outwardly spaced and downwardly spaced parallel relation thereto, said light housing units being thereby disposed entirely without the vertical projection of the exterior of said ballast housing unit whereby light emanating from the light pervious upper portions of said light housing units illuminates regions surrounding said ballast housing unit, and means integrally connecting said ballast housing and light housing units.

2. An indirect lighting system for providing uniform indirect illumination comprising a ballast housing unit adapted for support subjacent a light reflective ceiling, ballast elements disposed within said ballast housing unit, a pair of light housing units having light pervious upper portions through which light can pass generally upwardly to be reflected from said light reflective ceiling, said light housing units being respectively disposed on opposite sides of said ballast housing unit in outwardly and downwardly spaced parallel relation thereto, said light housing units being disposed a substantial distance laterally beyond the vertical projection of said ballast housing unit whereby light emanating from the light pervious upper portions of said light housing units illuminates regions surrounding said ballast housing unit, and strut assemblies transversely secured between said ballast housing unit and light housing units at longitudinally spaced locations thereof.

3. An indirect lighting system comprising a ballast housing unit adapted for support subjacent a ceiling, a first pair of light housing units having light pervious upper portoins and respectively disposed on opposite sides of said ballast housing unit in outwardly and downwardly spaced parallel relation thereto, said light housing units being disposed a substantial distance laterally beyond the vertical projection of said ballast housing unit, strut assemblies transversely secured between said ballast housing unit and first pair of light housing units at longitudinally spaced locations thereof, at least one other pair of light housing units disposed in outwardly and downwardly spaced relation to said first pair thereof, each of said other pairs of light housing units being disposed a substantial distance laterally beyond the vertical projection of upwardly and inwardly adjacent light housing units, and strut assemblies transversely secured between said light housing units at longitudinally spaced locations thereof.

4. An indirect lighting system comprising at least one ballast housing defined by a plurality of modular ballast housing sections in aligned end-to-end abutment, at least one light housing defined by a plurality of modular light housing sections in aligned end-to-end abutment, said light housing disposed in outwardly and downwardly spaced parallel relation to said ballast housing and having a light pervious upper portion, said light housing disposed a substantial distance laterally beyond the vertical projection of said ballast housing, ballast elements disposed within said ballast housing, light tubes disposed within said light housing, first bracket plates respectively secured to side walls of adjacent ones of said ballast housing sections in bridging relation to the ends thereof and adjacent free ends thereof, second bracket plates respectively secured to side walls of adjacent ones of said light housing sections in bridging relation to the ends thereof and adjacent free ends thereof, tubular struts secured between transversely aligned sets of said first and second bracket plates, and wires electrically connecting said ballast elements and light tubes, said wires extending from said ballast and light housings interiorly through said struts.

5. An indirect lighting system according to claim 4, further defined by said ballast and light housing sections respectively having rectangular openings in their side walls extending longitudinally inward from one end thereof, and said first and second bracket plates having apertures communicated with the bores of said struts, said openings having a longitudinal length less than half the width of said first and second bracket plates and greater than the difference between half the width of said first and second bracket plates and the radius of said apertures whereby said first and second bracket plates cover said openings and said openings communicate with said apertures to facilitate entry of said wires to the bores of said struts.

References Cited by the Examiner
UNITED STATES PATENTS

| | | | |
|---|---|---|---|
| 2,632,096 | 3/53 | Kochale, et al. | 240—51.11 |
| 2,659,807 | 11/53 | Wakefield | 240—9 |
| 2,807,709 | 9/57 | Guth | 240—51.11 X |
| 2,888,113 | 5/59 | Schwartz et al. | 240—9 X |
| 2,956,150 | 10/60 | Schwartz et al. | 240—9 |
| 2,990,470 | 6/61 | Bodian et al. | 240—51.11 |
| 2,998,508 | 8/61 | Bobrick | 240—9 X |

NORTON ANSHER, *Primary Examiner.*